United States Patent
Sumiyoshi et al.

(10) Patent No.: US 7,801,060 B2
(45) Date of Patent: Sep. 21, 2010

(54) NETWORK MANAGEMENT APPARATUS AND NETWORK SYSTEM

(75) Inventors: Takashi Sumiyoshi, Kokubunji (JP); Hideki Okita, Kokubunji (JP); Yoji Ozawa, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 709 days.

(21) Appl. No.: 11/542,436

(22) Filed: Oct. 4, 2006

(65) Prior Publication Data

US 2007/0076634 A1 Apr. 5, 2007

(30) Foreign Application Priority Data

Oct. 5, 2005 (JP) ............................. 2005-291901

(51) Int. Cl.
*H04L 12/28* (2006.01)
*H04L 12/56* (2006.01)

(52) U.S. Cl. ...................................... 370/255; 370/389

(58) Field of Classification Search ................ 370/254, 370/255, 389
See application file for complete search history.

(56) References Cited

U.S. PATENT DOCUMENTS 5,983,270 A * 11/1999 Abraham et al. ............ 709/224
2003/0069947 A1 4/2003 Lipinski
2004/0264388 A1 * 12/2004 Rover et al. ................. 370/254
2005/0283823 A1 * 12/2005 Okajo et al. .................... 726/1
2006/0215650 A1 * 9/2006 Wollmershauser et al. .. 370/389

FOREIGN PATENT DOCUMENTS

JP 2005-050302 3/2004

* cited by examiner

*Primary Examiner*—Ronald Abelson
(74) *Attorney, Agent, or Firm*—Stites & Harbison, PLLC; Juan Carlos A. Marquez, Esq

(57) ABSTRACT

A network management apparatus and a network management system are provided which are capable of reducing setting workloads required when an initial setting operation of a network communication apparatus is performed, and a network structure is changed. The network management apparatus acquires information as to respective network communication apparatus which belong to the same network when an operation of the network is commenced, or when a structure of the network is changed. Then, the network management apparatus determines a concrete operating content of said network communication apparatus based upon the acquired information and an operation policy so as to set the determined operating content. Also, the network management apparatus is equipped with a GUI (Graphical User Interface) used to set a role of the network communication apparatus by a manner.

8 Claims, 15 Drawing Sheets

FIG.5

| REQUEST MESSAGE ID | PORT | RECEPTION STATUS | 534 |
|---|---|---|---|
| 0 | Port1 | Received | |
| 1 | Port1 | Sent | |

FIG.6

| REQUEST MESSAGE ID | RECEPTION TIME | RECEPTION PORT | COUNTER MAC ADDRESS | 1055 |
|---|---|---|---|---|
| 0 | 00:00:10 | Port0 | 00:11:22:33:44:55 | |
| 1 | 00:01:24 | Port1 | 00:11:22:33:44:66 | |

FIG.7

| # | Name | Type | NEIGHBOR NODE | FILTER SETTING OPERATION | IP ADDRESS |
|---|---|---|---|---|---|
| 0 | - | Endnode | - | - | 192.168.121.0/24 |

FIG.8

| # | Name | Type | NEIGHBOR NODE | FILTER SETTING OPERATION | IP ADDRESS | 1057 |
|---|---|---|---|---|---|---|
| 0 | - | L2SW | 1 @ Port2<br>2 @ Port3 | Inbound, Outbound | 192.168.120.1 | |
| 1 | - | Endnode | 0 @ Port1 | - | - | |
| 2 | - | Endnode | 0 @ Port1 | - | - | |

FIG.9

| # | Name | Type | NEIGHBOR NODE | FILTER SETTING OPERATION | IP ADDRESS |
|---|------|------|---------------|--------------------------|------------|
| 0 | core | L3SW | 1 @ Port2<br>2 @ Port3<br>7 @ Port5 | Inbound,<br>Outbound | 192.168.100.1 |
| 1 | - | L2SW | 0 @ Port1<br>3 @ Port2<br>4 @ Port3 | Inbound,<br>Outbound | 192.168.120.1 |
| 2 | - | L2SW | 0 @ Port1<br>5 @ Port2<br>6 @ Port3 | None | 192.168.130.1 |
| 3 | - | Endnode | 1 @ Port1 | - | 192.168.121.0/24 |
| 4 | - | Endnode | 1 @ Port1 | - | 192.168.122.0/24 |
| 5 | - | Endnode | 2 @ Port1 | - | 192.168.131.0/24 |
| 6 | - | Endnode | 2 @ Port1 | - | 192.168.132.0/24 |
| 7 | - | Router | 0 @ Port1<br>8 @ Port2 | Inbound,<br>Outbound | 192.168.110.1 |
| 8 | - | No info | - | - | - |

| # | Name | Type | NEIGHBOR NODE | FILTER SETTING OPERATION | IP ADDRESS |
|---|---|---|---|---|---|
| 0 | - | Manager | 1 @ Port1 | - | - |
| 1 | core | L3SW | 0 @ Port1<br>2 @ Port2<br>3 @ Port3<br>8 @ Port5 | Inbound,<br>Outbound | 192.168.100.1 |
| 2 | - | L2SW | 1 @ Port1<br>4 @ Port2<br>5 @ Port3 | Inbound,<br>Outbound | 192.168.120.1 |
| 3 | - | L2SW | 1 @ Port1<br>6 @ Port2<br>7 @ Port3 | None | 192.168.130.1 |
| 4 | - | Endnode | 2 @ Port1 | - | 192.168.121.0/24 |
| 5 | - | Endnode | 2 @ Port1 | - | 192.168.122.0/24 |
| 6 | - | Endnode | 3 @ Port1 | - | 192.168.131.0/24 |
| 7 | - | Endnode | 3 @ Port1 | - | 192.168.132.0/24 |
| 8 | - | Router | 1 @ Port1<br>9 @ Port2 | Inbound,<br>Outbound | 192.168.110.1 |
| 9 | - | No info | - | - | - |

FIG.12

| ROLE | CONDITION |
|---|---|
| CORE | Name="core" Type="L3SW" |
| FLOOR | Neighbor=CORE Type="L2SW" |
| FLOOR END | Neighbor=FLOOR Type="Endnode" or "Vacant" |
| UNDEFINED | NO CONDITION |

| From | To | Flow | Action |
|---|---|---|---|
| FLOOR END | UNDEFINED | non HTTP | Drop |
| UNDEFINED | FLOOR END | TCP SYN | Drop |
| UNDEFINED | FLOOR END | UDP | Drop |
| * | * | * | Accept |

| #: | PORT | DIRECTION | TRANSMISSION DESTINATION IP ADDRESS | TRANSMISSION SOURCE IP ADDRESS | Flow | Action |
|---|---|---|---|---|---|---|
| 1 | 2 | Inbound | * | 192.168.121.0/24, 192.168.122.0/24, 192.168.131.0/24, 192.168.132.0/24 | non HTTP | Drop |
| 1 | 3 | Inbound | | | | |
| 1 | 5 | Outbound | | | | |
| 2 | 1 | Outbound | | | | |
| 2 | 2 | Inbound | | | | |
| 2 | 3 | Inbound | | | | |
| 1 | 2 | Outbound | 192.168.121.0/24, 192.168.122.0/24, 192.168.131.0/24, 192.168.132.0/24 | * | TCP SYN | Drop |
| 1 | 3 | Outbound | | | | |
| 1 | 5 | Inbound | | | | |
| 2 | 1 | Inbound | | | | |
| 2 | 2 | Outbound | | | | |
| 2 | 3 | Outbound | | | | |
| 1 | 2 | Outbound | 192.168.121.0/24, 192.168.122.0/24, 192.168.131.0/24, 192.168.132.0/24 | * | UDP | Drop |
| 1 | 3 | Outbound | | | | |
| 1 | 5 | Inbound | | | | |
| 2 | 1 | Inbound | | | | |
| 2 | 2 | Outbound | | | | |
| 2 | 3 | Outbound | | | | |
| 1 | * | * | * | * | * | Accept |
| 2 | * | * | * | * | * | Accept |

539

NETWORK MANAGEMENT APPARATUS AND NETWORK SYSTEM

The present application claims priority from Japanese application JP2005-291901 filed on Oct. 5, 2005, the content of which is hereby incorporated by reference into this application.

BACKGROUND OF THE INVENTION

The present invention is related to a network management apparatus connected to an information communication network and for operating/managing the information communication network in an autonomous manner, and also related to a network management system which is arranged by the network management apparatus and the information communication network.

Packet switching type information communication networks (hereinafter simply referred to as "networks") known as IP (Internet Protocol) networks and the like utilized in enterprises are arranged by employing various sorts of network communication apparatus such as routers, switches, gateways, and access points. In order that these networks may function in correspondence with intentions of managers and/or users, these managers and/or users are required to set proper operations with respect to all of these network communication apparatuses.

There are such trends that currently available networks are constructed in large scales and have high functions. Accordingly, there are similar trends that sorts and amounts as to setting items of packet communication apparatuses are increased. As major setting items, the following setting items are conceivable: security setting items which are required to utilize external networks such as the Internet; network service setting items for guarantee bands which are used by application software such as VoIP (Voice over IP); operation management setting items as to charging, access logs, and monitoring.

As explained above, if the sorts and amounts of these setting items as to these packet communication apparatuses are increased, then the below-mentioned problems may occur in enterprises:
1. Increases in management costs (work time of managers) in connection with increases in work amounts of managers.
2. Delays in network service-in time in connection with increases of setting work time.
3. Increases in mis-setting operations in connection with increases in work contents.

The cause of these problems may be conceived by that complex setting works are increased in an explosive manner. For instance, there is such a case that in order to set security items with respect to an entire network, these security items must be set to almost all of packet communication apparatuses provided within a network, and on the other hand, work amounts of these security setting items are increased directly proportional to scales of networks. Furthermore, in another case that other setting contents such as routing and access controls must be updated in conjunction with the above-explained security setting operations, work amounts thereof are increased in connection with increases in sorts and amounts of these setting items.

In methods of US2003/0069947 and JP-A-2005-050302, setting works are automatically carried out with respect to communication apparatus so as to solve the above-explained problems.

Although the above-explained methods disclosed in US2003/0069947 and JP-A-2005-050302 can reduce work amounts of managers, physical configurations of networks must be determined in advance, and setting contents corresponding to the networks must be previously prepared by these managers. As a result, when the structures of the networks are changed and a failure happens to occur in the networks, the managers must perform setting works.

As changing factors as to the physical configurations of the networks, structures are expanded in a planning manner and failures happen to occur, which may frequently occur. Every time there occurs such an event as an occurrence of a failure or expansion of structure, managers must monitor the failure of a network, must investigate a topology of this network and then, must newly form a configuration definition so as to perform setting works. As a result, work amounts of the above-explained methods are still large.

SUMMARY OF THE INVENTION

To solve the above-explained problems, a network management apparatus, according to one aspect of the present invention, acquires topologies, apparatus types and apparatus identifiers of respective network communication apparatuses in a network when the network is initially set and a physical configuration of this network is changed, and then, automatically determines roles of these respective network communication apparatuses based upon role assigning information applied by a manger. Furthermore, the network management apparatus acquires such operating contents of the network communication apparatuses to set the acquired operating contents, while these operating contents can satisfy an operation policy given by the manager.

Also, the network management apparatus, according to another aspect of the present invention, is equipped with a GUI (Graphical User Interface) by which a role can be applied by the manager to the network communication apparatuses. Then, the network management apparatus acquires an operating content of a network communication apparatus based upon the roles applied to the respective network communication apparatuses by employing the GUI by the manager and the operation policy given by the manager, and then sets the acquired functional description of this network communication apparatus.

More concretely speaking, the present invention is featured by providing a network management system in a network arranged by one or more network management apparatuses, and one or more network communication apparatuses. That is, in the network management apparatus equipped with a network interface connectable with a network, a storage apparatus for storing thereinto a program and data; and a processor for executing a process operation in accordance with the program, the network management apparatus is comprised of: means for acquiring one or more pieces of information among topologies (connection relationship among respective network communication apparatuses), apparatus types, and apparatus identifiers as to the respective network communication apparatuses belonging to the same network and for holding the acquired information; means for applying roles to the respective network communication apparatuses; means for holding operation policies in which abstractive operating contents are described with respect to the roles; and means for determining concrete operating contents of the respective network communication apparatuses based upon the information and the operation policies of the respective network communication apparatuses, and for setting the determined concrete operating contents to the network communication apparatuses. In the network communication apparatus equipped with: a network interface connectable to the network; a processor for processing a packet received by the network interface; and a storage apparatus for holding a route table required for the processing operation, the network communication apparatus is comprised of: means responding to an information request issued from the network management apparatus; and means for operating in accordance with a setting condition from the network management apparatus. When the operation of the network is commenced and the structure of the network is changed, the network management apparatus acquires one or more pieces of information among the above-explained topologies, apparatus types, and apparatus identifiers of the respective network communication apparatuses belonging to the same network; the roles are applied to the respective network communication apparatuses by the means for applying the roles; and the network management apparatus determines concrete operating contents of the respective network communication apparatuses based upon the operation policies from the applied roles, and then, sets the determined concrete operating contents to the network communication apparatuses.

Further, the present invention is to provide a network management system featured by that the network management apparatus is comprised of: means for holding a role assigning rule which describes both roles to be assigned to a network communication apparatus, and a condition with respect to one or more pieces of information among the above-explained topologies, apparatus types, and apparatus identifiers of such a network communication apparatus, which should be satisfied in order that this network communication apparatus judges as being the roles in correspondence thereto. As the means for applying the roles, the role assigning rule is employed.

In addition, the present invention is featured by providing such a network management system that the network management apparatus is further comprised of: means for notifying one or more pieces of information among the above-explained topologies, apparatus types, and apparatus identifiers of the network communication apparatuses in the network to the manager, and for designating a role which is applied to the respective network communication apparatuses. The network management apparatus notifies to the manager, one or more pieces of the information among the above-explained topologies, apparatus types, and apparatus identifiers of the network communication apparatuses, which are acquired by the network communication apparatuses, and determines concrete operating contents of the respective network communication apparatuses based upon the operation policy from the role designated by the manager based on the notified content.

Moreover, the present invention is to provide such a network management system featured by that the operating contents described in the operation policy correspond to packet filtering which describes a permission/non-permission of communication among the roles; and operating contents set to the respective network communication apparatuses correspond to operations of packet filtering functions of the network communication apparatuses.

In accordance with the present invention, the below-mentioned advantages are obtained:

1. Since an apparatus of a packet switching network is automatically set, an increase in management costs, a delay in service-in times, and mis-setting operations can be suppressed.
2. A change in a physical configuration of a network is detected, and thus, a setting operation is carried out without intervening of a manager, or by executing a minimum setting work in accordance with network operation policy established in the beginning.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram for indicating topology acquiring condition information 534 of the management apparatus 500 according to the first embodiment of the present invention.

FIG. 6 is a diagram for indicating request receiving ID information 1055 of a packet communication apparatus.

FIG. 7 shows information contained in a topology notification message which is transmitted by a terminal 121.

FIG. 8 indicates neighbor information of the packet communication apparatus 120.

FIG. 9 indicates neighbor information of the packet communication apparatus 100.

FIG. 10 shows topology information 535 of the management apparatus 500 according to the first embodiment of the present invention.

FIG. 12 is a diagram for showing role definition information 536 of the management apparatus 500 according to the first embodiment of the present invention.

FIG. 15 is a diagram for showing filter definition information 538 of the management apparatus 500 according to the first embodiment of the present invention.

FIG. 16 is a diagram for showing filter definition information 539 of the management apparatus 500 according to the first embodiment of the present invention.

DETAILED DESCRIPTION OF THE EMBODIMENTS

1. System Arrangement/Apparatus Structure

Figure 1:
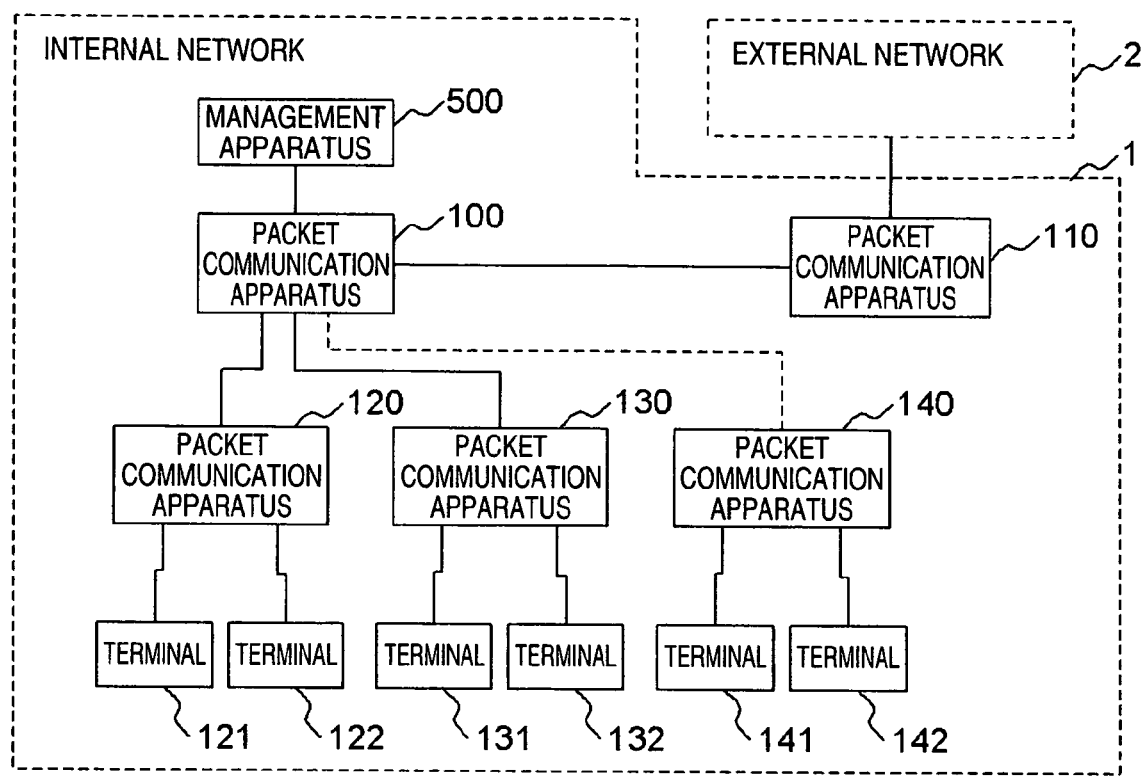
FIG. 1 is a structural diagram for showing a network where a packet communication apparatus of the present invention is arranged.

FIG. 1 is a network to which a network management system of the present invention has been applied, which is employed in descriptions of the below-mentioned embodiments.

The network is arranged by an internal network 1 managed by a manager, and an external network 2 which is connected to the internal network 1. The internal network 1 is arranged by packet communication apparatuses 100, 110, 130, and 140. While the packet communication apparatus 100 has a role of a core switch of the network 1, this packet communication apparatus 100 has been connected to other packet communication apparatuses 110, 120, and 130, but has not yet been connected to the packet apparatus 140 under initial condition. The packet communication apparatuses 120, 130, 140 correspond to floor switches installed on the respective floors, and have stored thereinto terminals 121 and 122, terminals 131 and 132, and also, terminals 141 and 142, respectively. The packet communication apparatus 110 has a role of a gateway which is connected to the external network 2. Furthermore, a management apparatus 500 according to a first embodiment of the present invention, which manages the internal network 1, has been connected to the packet communication apparatus 100.

Figure 2:
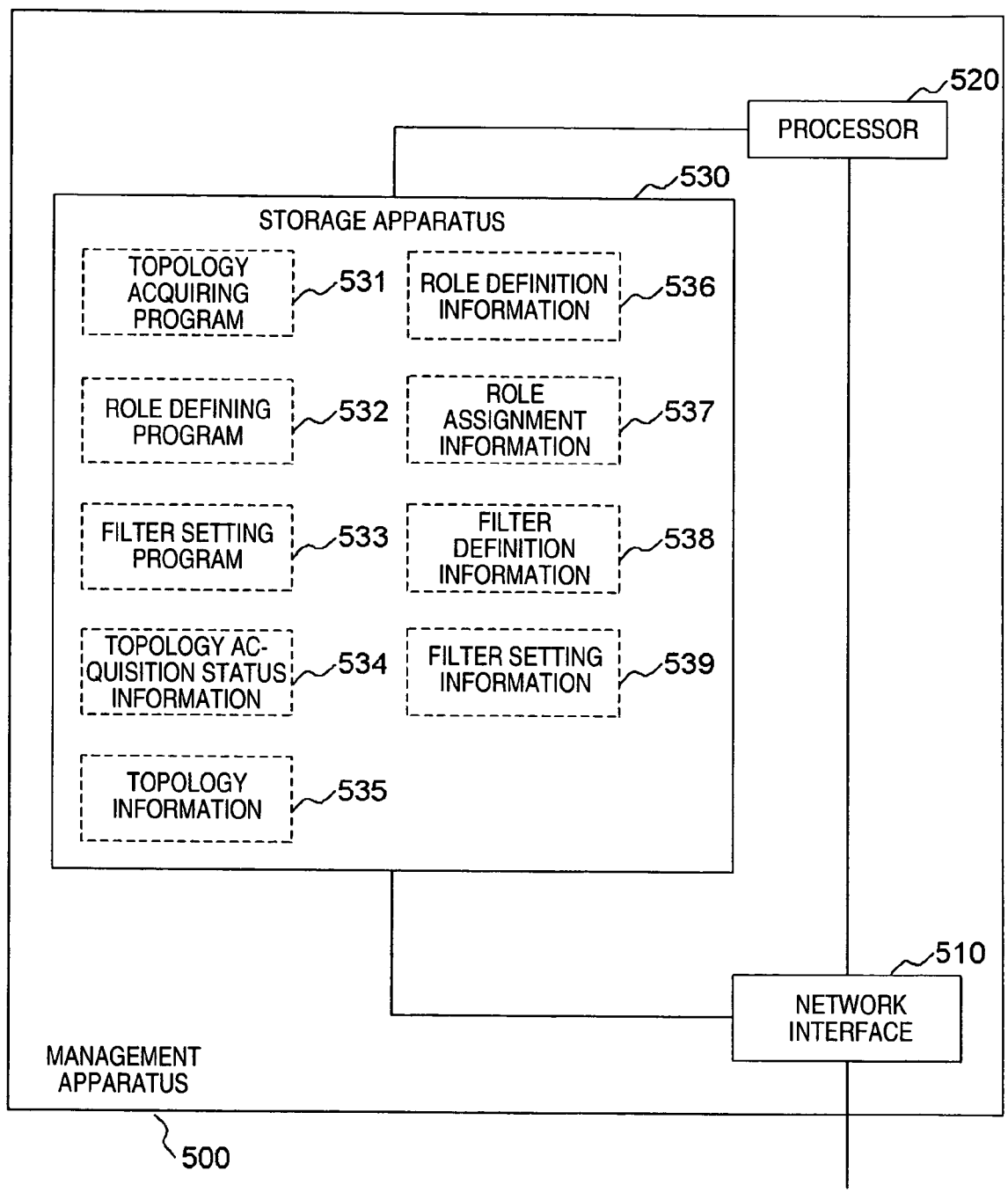
FIG. 2 is a structural diagram of a management apparatus 500 according to a first embodiment of the present invention.

Referring now to FIG. 2, the management apparatus 500 of the first embodiment will be described.

The management apparatus 500 contains a network interface 510, a processor 520, and a storage apparatus 530. The storage apparatus 530 stores thereinto a topology acquiring program 531, a role defining program 532, a filter setting program 533, a topology acquisition status information 534, topology information 535, role definition information 536, role allocation information 537, filter definition information 538, and filter setting information 539. The contents of the above-explained programs and information will be explained later.

Figure 3:
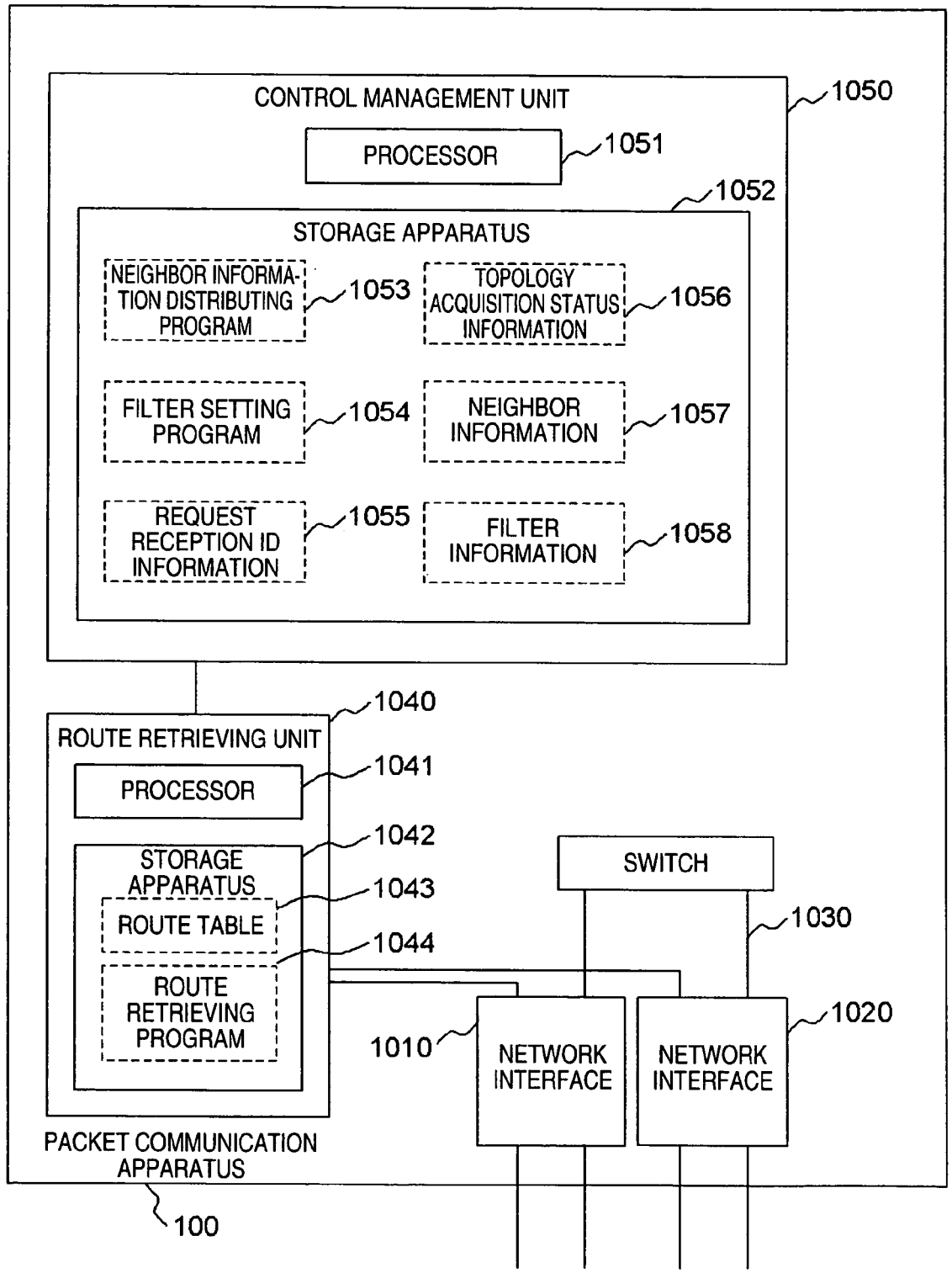
FIG. 3 is a structural diagram for representing packet communication apparatus 100, 110, 120, 130 and 140.

Referring now to FIG. 3, the packet communication apparatus 100 will be explained. It should be noted that the packet communication apparatuses 110, 120, 130, and 140 have similar structures to the structure of the packet communication apparatus 100. The packet communication apparatus 100 is arranged by network interfaces 1010 and 1020, a switch 1030, a route retrieving module 1040, and a module control management module 1050.

The route retrieving module 1040 is arranged by a processor 1041 and a storage apparatus 1042. The storage apparatus 1042 stores thereinto a route table 1043 and a route retrieving program 1044. The processor 1041 acquires transfer destinations of packets received from the network interfaces 1010 and 1020 with reference to the route table 1043 in accordance with the route retrieving program 1044. In the case that the received packets are data packets, the processor 1041 transfers the data packets from a transfer destination network interface by employing the switch 1030. In the case that the received packets are control packets, the processor 1041 transfers the control packets to the control managing module 1050.

The control managing module 1050 is arranged by a processor 1051 and a storage apparatus 1052. The storage apparatus 1052 stores thereinto an neighbor information distributing program 1053, a filter setting program 1054, request reception ID information 1055, topology acquisition status information 1056, neighbor information 1057, and filter information 1058. The contents of the above-described information will be explained later.

2. Acquisition of Topology Information

Figure 4:
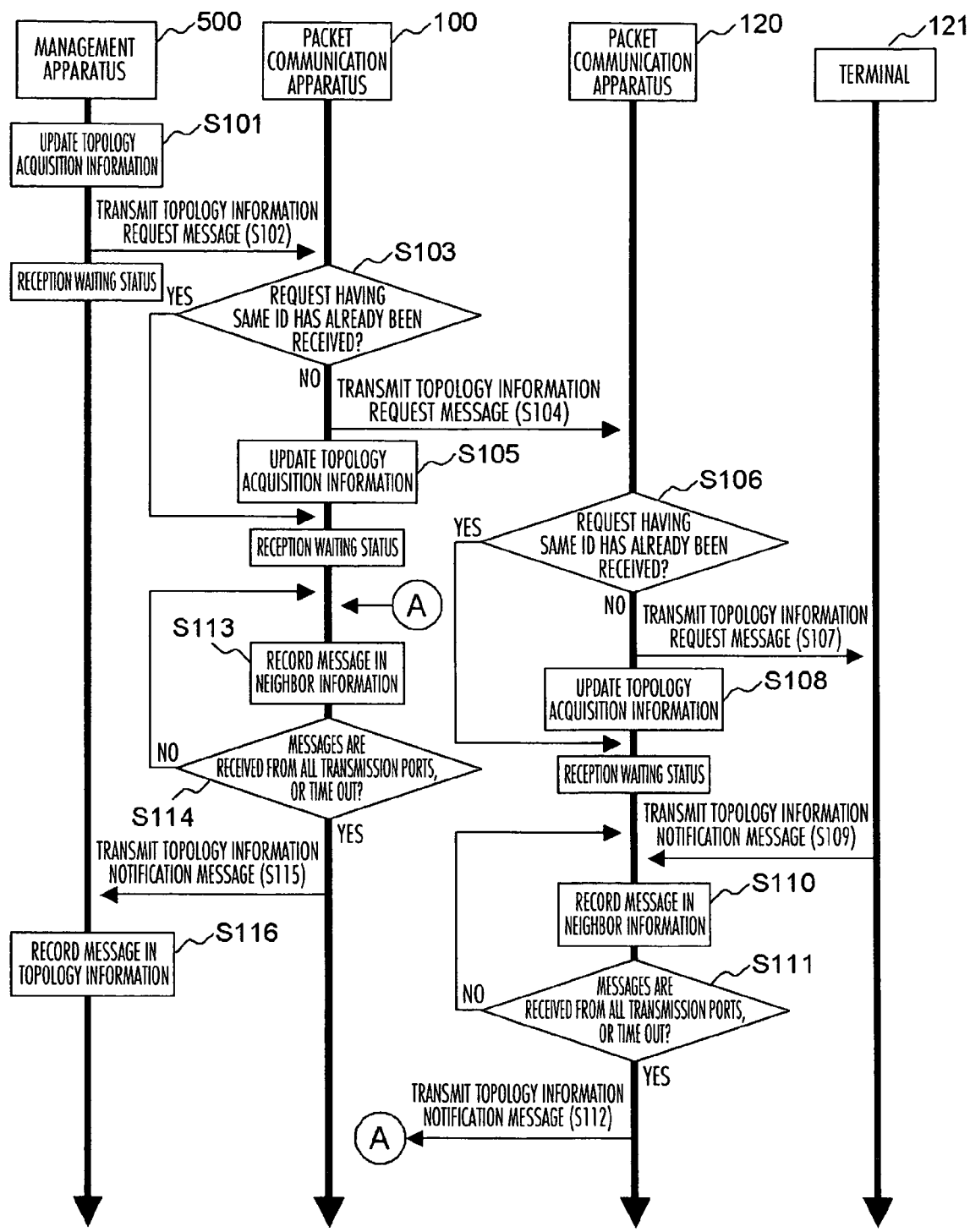
FIG. 4 is a diagram for representing a topology acquiring process operation of the management apparatus 500 according to the first embodiment of the present invention.

Referring now to FIG. 4, a topology acquiring process operation of the network by the management apparatus 500 in the network of FIG. 1 will be explained. This topology acquiring process operation is executed by the processor 520 of the management apparatus 500 in accordance with the topology acquiring program 531.

First, the processor 520 refers to the topology acquisition status information 534 shown in FIG. 5. The topology acquisition status information 534 is constituted by (request message ID, port and reception status), and holds such an information as to whether or not a notification message is received with respect to a request message which is identified by a request message ID transmitted to a certain port. The processor 520 refers to a column of a request message ID of the topology acquisition condition information 534 so as to acquire a request message ID(=x) which is not utilized, and adds such an information as (x, p, Sent) to the topology acquisition status information 534 (S101). In this information, symbol "p" indicates a port connected to the network managed by the management apparatus 500.

Next, topology information request message is transmitted to a neighbor packet communication apparatus (S102). A transmission source address of this request message is a MAC address corresponding to an identifier of a network interface of a port to which the request message is transmit; a transmission destination address is a broadcast address; and a message content corresponds to an identifier and a request memory ID (=x) which indicate that this message is a topology information request message. After the transmission of the topology information request message has been accomplished, the management apparatus 500 is brought into a reception waiting status of a topology information notification message.

Next, description is made of operations of the packet communication apparatus 100 which has received the topology information request message from the management apparatus 500. This process operation is performed by the processor 1051 of the packet communication apparatus 100 in accordance with the neighbor information distributing program 1053.

Firstly, the processor 1051 refers to the request reception ID information 1055 shown in FIG. 6 by employing the request message ID (=x) of the received topology information request message (S103). In the request reception ID information 1055, (request message IDs, reception time instants, reception ports, counter MAC addresses) of all of topology information request messages received after the packet communication apparatus 100 has been initiated have been stored. A counter MAC address is equal to a transmission source MAC address of a topology information request message. When the request message ID of the received topology information request message has not already been contained in this counter MAC address, such an entry as (x, present time instant, reception port) is added to the request reception ID information 1055, and the topology information request message is transmitted from the respective ports "p" other than the reception port (S104). The transmission source address of this message corresponds to an MAC addresses of a port for transmitting the request message (S104), and the request message ID is "x." In the network of FIG. 1, this message is transmitted to the packet communication apparatuses 110, 120, 130, and 150. Also, such information of (x, p, Sent) is added to the topology acquisition status information 1056

(S105). The format of the topology acquisition status information 1056 is identical to that of the topology acquisition status information 534 shown in FIG. 5. After the transmission of this message has been accomplished, the packet communication apparatus 100 is brought into a reception waiting status of the topology information notification message.

Next, description is made of operations of the packet communication apparatus 120 which has received the topology information request message from the packet communication apparatus 100. It should also be noted that although FIG. 4 indicates process operations as to only the packet communication apparatus 120, similar process operations are carried out in other packet communication apparatuses 110, 130, and 140. This process operation is executed by the processor 1051 of the packet communication apparatus 120 in accordance with the neighbor information distributing program 1053.

First, the processor 1051 refers to the request reception ID information 1055 by employing the request message ID (=x) of the received topology information request message (S106). When the request message ID of the received topology information request message has not been already contained in this request reception ID information 1055, such an entry (x, present time, and reception port) is added to the request reception ID information 1055, and a topology information message is transmitted from each of the ports "p" except for the received port (S107). A transmission source address of this message is a MAC address of a network interface to which this message is sent, and the request message ID is "x." Also, such an information (x, p, Sent) is added to the topology acquisition condition information 1056 (S108). After the transmission of this message has been accomplished, the packet communication apparatus 100 is brought into a reception waiting status of the topology information notification message.

When the terminal 121 (similar to terminals 122, 131, 132, 141, and 142) receives the topology information request message, the terminal 121 transmits the topology information notification message (S109). While the topology information notification message employs the transmission source MAC address of the topology information request message as the transmission source address, this topology information notification message contains as message contents, an identifier indicative of the topology information notification message; a request message ID of the topology information request message; an identifier ("Port0" in this case) of such a port that the terminal 121 receives the topology information request message; and further, information shown in FIG. 7 (row number (#), an apparatus name (Name), an apparatus type (Type), neighbor node, filter setting, setting ID address). As the apparatus sort, the own apparatus type information (=Endnode) is set, and since the neighbor node is not present at any node except for the node which receives the topology information request message, the neighbor node is an empty column. Since the filter setting operation cannot be carried out in the column for filter setting operation, this column is an empty column. A sub-net address belonging to the own network is set to the column of the setting IP address.

When the packet communication apparatus 120 receives the topology information notification message from the terminal 121 and the terminal 122, the packet communication apparatus 120 refers to the topology acquisition status information 1056 from the request message ID and the reception port number of this message so as to acquire a reception status. In the case that the relevant record is not present, or the reception status is "Received", the packet communication apparatus 120 discards the relevant message. When the reception status corresponds to "Sent", the packet communication apparatus 120 changes is reception status into "Received" and forms neighbor information 1057 shown in FIG. 8 (S110).

The neighbor information 1057 is constituted by (node number (#), apparatus name (Name), apparatus type (Type), neighbor node, filter setting, and setting IP address). The own apparatus information has been already recorded in the node number "0." In this case, such information as to whether or not which filter setting operation is available for the own apparatus is set to the filter setting column, and an IP address connected in order that an external node performs the own filter setting operation is set to the setting IP address. In an example shown in FIG. 8, filter setting operations can be carried out on both an input side (Inbound) and an output side (Outbound), and this example indicates that an IP address for a setting purpose is "192.168.120.1."

Also, when the above-explained topology information notification message is received, the packet communication apparatus 120 conducts a neighbor relationship from an identifier of a port and contained in the received topology information notification message and also from the information of FIG. 7, and then, stores the conducted neighbor relationship into the neighbor information 1057. Concretely speaking, in the case that the packet communication apparatus 120 receives a topology information notification message from each of the terminals 121 and 122 connected to "Port 2" and "port 3", the packet communication apparatus 120 updates the entire portions of the node members 1 and 2, and the neighbor node column of the node number 0 of FIG. 8.

Thereafter, the packet communication apparatus 120 checks as to whether or not reception statuses as to all of the records having the relevant request IDs(=x) among the topology acquisition status information 1056 are "Received" (S111). In the case that the reception statuses are "Received", the packet communication apparatus 120 contains the neighbor information 1057 in the topology information notification message to transmit the resultant neighbor information 1057 (S112). The transmission destination address of the topology information notification message sets the counter MAC address of the record for extracting the request reception ID information 1055 of FIG. 6 by the request message ID (=x), and the request message ID sets "x."

When the packet communication apparatus 100 receives the topology information notification messages from the packet communication apparatuses 110, 120, and 130, the packet communication apparatus 100 refers to the topology acquisition status information 1056 from the request message IDs and the reception port numbers of the messages so as to acquire a reception status. In the case that the relevant record is not present, or the reception status is "Received," the packet communication apparatus 100 discards the relevant message. When the reception status corresponds to "Sent", the packet communication apparatus 100 changes this reception status into "Received" and similarly forms neighbor information 1057 (S113). In the case that the packet communication apparatus 100 receives the topology information notification messages from the packet communication apparatus 110, 120, and 130, such neighbor information 1057 shown in FIG. 9 is obtained.

Furthermore, the packet communication apparatus 100 checks as to whether or not reception statuses as to all of the records having the relevant request IDs among the topology acquisition status information 1056 are "Received" (S114). In the case that the reception statuses are "Received", the packet communication apparatus 100 contains the neighbor information 1057 shown in FIG. 9 in the topology information notification message to transmit the resultant neighbor information 1057 (S115). The transmission destination address of the topology information notification message and the request message ID are determined in a similar manner to those of the packet communication apparatus 120.

When the management apparatus 500 receives the topology information notification message from the packet communication apparatus 100, the management apparatus 500 refers to the topology acquisition status information 534 from the request message ID and the reception port number of this received message so as to acquire a reception status. In the case that the relevant record is not present, or the reception status is "Received", the management apparatus 500 discards the relevant message. When the reception status corresponds to "Sent", the management apparatus 500 changes this reception status into "Received" and forms such topology information 535 shown in FIG. 10 in a similar manner to the topology information 535 shown in FIG. 10 (S116).

As previously explained, since the management apparatus 500 executes a topology acquisition process operation, the management apparatus 500 can acquires the topology of the network. This topology acquisition process operation is carried out in a periodic manner, or when a change of a network is detected.

3. Role Definition

Figure 11:
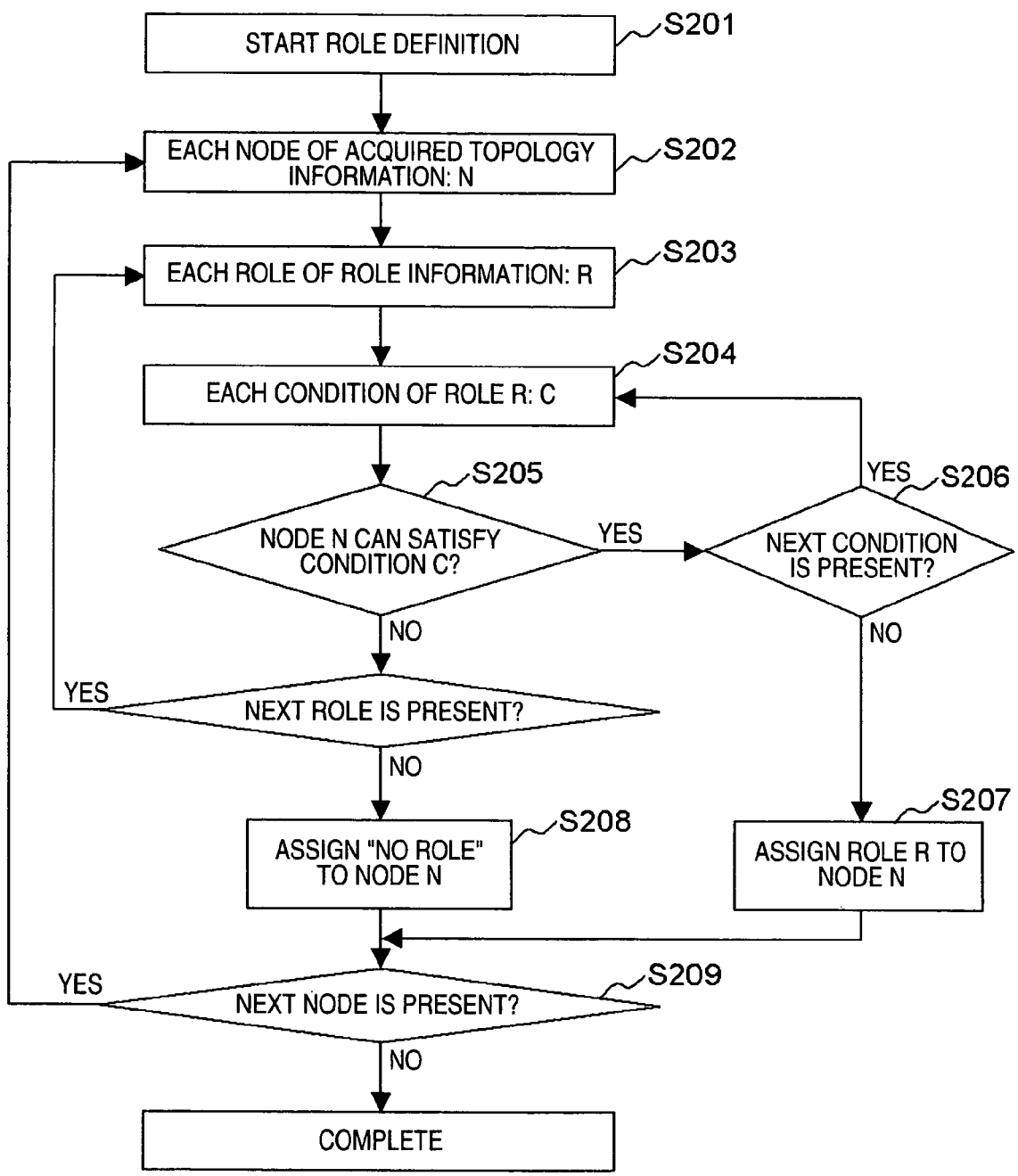
FIG. 11 is a flowchart for indicating a role defining process operation of the management apparatus 500 according to the first embodiment of the present invention.

Referring now to a flowchart of FIG. 11, a description is made of a role definition process operation of a packet communication apparatus by the management apparatus 500. This process operation is carried out by the processor 520 of the management apparatus 500 in accordance with the role defining program 532.

The manager has previously applied such a role definition information 536 indicated in FIG. 12 to the management apparatus 500. While the role definition information 536 is arranged by (role and condition), one or more pieces of conditions can be set with respect to one role. As the condition, the following conditions can be designated: That is, it is possible to designate that whether or not either a name (Name) or a type (Type) is made coincident with respect to a certain node, or whether or not a designated node is contained in a neighbor node (Neighbor) of a certain node.

When the processor 520 commences a role definition (S201), the processor 520 firstly starts a loop as to each node "N" contained in the topology information 535 (S202). Furthermore, the processor 520 commences a loop as to each of roles "R" of the role definition information 536 shown in FIG. 12 (S203), and furthermore, starts a loop related to the respective conditions "C" of the role "R" (S204).

Next, the processor 520 judges as to whether or not the node N can satisfy the condition C (S205). When such a condition is found out that the node N cannot satisfy the condition C, the processor 520 performs a similar judging operation as to the next role (S206). In the case that the node N can satisfy all of conditions, the processor 520 assigns a role "R" to the node N (S207), and then, stores this content to the role assign information. In such a case that a role which can satisfy all of these conditions cannot be found out, the processor 520 assigns "no role" to the node N (S208), and then, stores the content thereof in the role assign information 537. The processor 520 executes the above-explained operations with respect to all of nodes (S209).

Since the role definition process operation is carried out by the processor 520 in accordance with the above-described manner, the role assign information 537 can be formed. Concretely speaking, the role assign information 537 can be obtained from the topology information 535 of FIG. 10 and the role definition information shown in FIG. 12.

This role definition process operation is carried out when the role assign information 537 is required to be updated, for example, the topology information 535 and the role definition information 536 are changed.

4. Filter Setting and Distributing Operations

Figure 14:
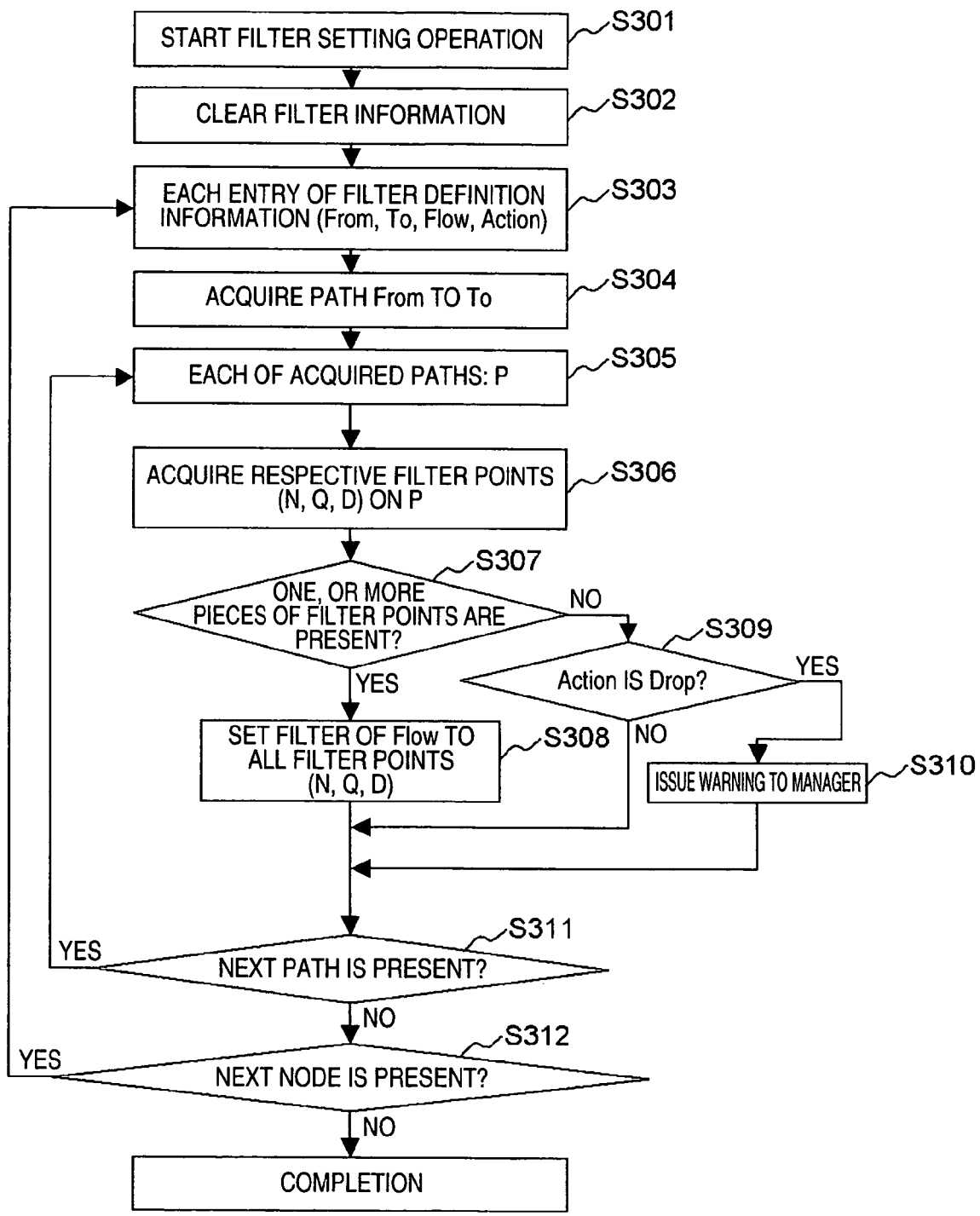
FIG. 14 is a flowchart for indicating a filter setting process operation of the management information 500 according to the first embodiment of the present invention.

Next, a filter setting process operation by the management apparatus 500 will now be explained with reference to a flowchart of FIG. 14. This process operation is carried out by the processor 520 of the management apparatus 500 in accordance with a filter setting program 533.

In the filter setting operation, filter definition information 538 shown in FIG. 15 is employed which is set by the manager. The filter definition information 538 is constructed of (From, To, Flow, Action). This filter definition information 538 defines a processing method (Action) related to a packet which is indicated by a condition of "Flow" flowing from "Flow" to "To". If "Action" of a packet is "Accept", then the processing method passes this packet through a network, whereas if "Action" of a packet is "Drop", then the processing method discards this packet on the network. With respect to a packet which is coincident with conditions of a plurality of entries, a processing method of an entry described at the uppermost grade is applied. An entry in which all of "From", "To", "Flow" are indicated by symbol "*" represents a process operation (default process operation) with respect to a packet which is not applicable to other entries.

When the processor 502 commences a filter setting operation (S301), the processor 502 clears the filter setting information 539. In a general-purpose packet transfer apparatus, all of flows are transferred without being filtered under this condition that a filter is not set.

Figure 13:
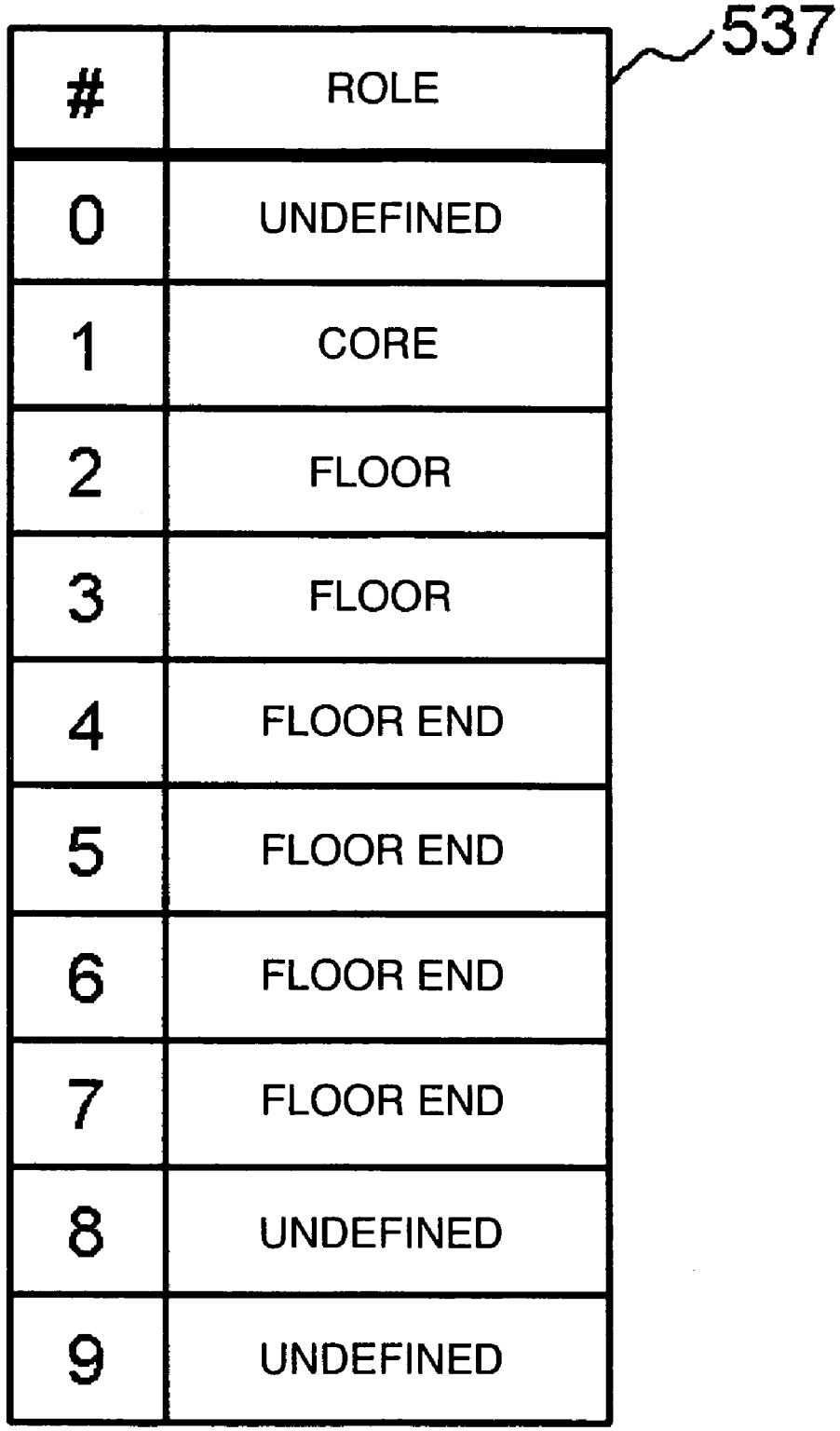
FIG. 13 is a diagram for showing role assign information 537 of the management apparatus 500 according to the first embodiment of the present invention.

Next, a loop of each entry of the filter definition information 538 is commenced (S303). As to the respective entries (From, To, Flow, Action), all of paths are acquired (S304) through which packets probably pass when the packets are directed from a node group indicated by "From" to a node group indicated by "To." Then, a loop as to each the acquired paths "P" is commenced (S305). In the loop as to each of the paths P, first of all, filter points (N, Q, D) are acquired (S306) which corresponds to such a place that a filter setting operation can be carried out on the path P by employing the topology information 535. In this case, symbol "N" shows a node, symbol "Q" indicates a port, and symbol "D" represents a direction indicative of one of inbound/outbound. For instance, in the topology information 535 shown in FIG. 10, filter points of paths through which packets directed from a node group "floor end" (namely, node 4 to node 7 in FIG. 13) to a node group "undefined" (namely, nodes 8 and 9 in FIG. 13) probably pass correspond to (node 2, port 2, inbound), (node 2, port 1, outbound), (node 1, port 2, inbound), (node 1, port 3, inbound), and (node 1, port 3, outbound). Although the node 3 is also involved in the paths, the filter setting operation cannot be carried out in this node 3 in accordance with the topology information 535 of FIG. 10. As a result, the node 3 does not constitute the filter point.

Next, the processor 520 checks as to whether or not one or more pieces of the above-acquired filter points are present. When one or more pieces of the acquired filter points are present, the processor 520 adds (N, Q, D, Flow, Action) to the filter setting information 539 with respect to all of the filter points (S307). To the contrary, when one or more pieces of the acquired filter points are not present, the processor 520 further checks as to whether or not "Action" is "Drop" (S309). If "Action" is "Drop", then there are some possibilities that the network may cause a not-intended packet to flow. As a result, the processor 520 issues such a warning to the manager (S310).

When the above-described process step is ended, the filter setting operation is advanced to a next path (S311). When all of the paths are processed, the filter setting operation is advanced to next filter definition information (S312).

When the above-described filter setting process operation is accomplished, the filter setting information 539 is actually set to the respective nodes. Concretely speaking, such filter setting information 539 shown in FIG. 16 is formed from the topology information 535 shown in FIG. 10, the role assigning information 537 indicated in FIG. 13, and the filter definition information 538 shown in FIG. 15.

With employment of the above-explained arrangement, in the network management system containing the management apparatus 500 according to the first embodiment of the present invention, the automatic setting operation of the filter can be realized.

5. Supplement of Filter Setting Operation

In a filter setting operation, a transmission source IP address of a packet which is transmitted in a terminal, it is easy to employ a transmission source IP address except for such a transmission source IP address supposed by the manager. Accordingly, there is a better case that the transmission source IP address of the terminal, which is supposed by the manager, is excluded from a condition of a filter, and a packet with respect to an arbitrary transmission source IP address is filtered. In the present invention, if the manager performs such a designation as to a management terminal, then a filter setting operation can be implemented without employing a transmission source IP address of a packet of a filter setting operation where "Action" is "Drop" as a condition.

6. Automatic Setting Operation Executed when Packet Communication Apparatus is Added Next, description is made of automatic setting operations when an unconnected packet communication apparatus 140 is connected to the packet communication apparatus 100 after the above-described automatic setting operation has been carried out.

When the management apparatus 500 detects a connection of the packet communication apparatus 140, the management apparatus 500 again performs the above-explained topology acquiring process operation, role defining process operation, and filter setting process operation. The role of the packet communication apparatus 140 is automatically assigned by the role defining process operation, so that filter setting information which should be set to the packet communication apparatus 140 may be acquired by the filter setting process operation.

In this case, as a method of detecting the packet communication apparatus 140, the following methods may be conceived: a method in which the packet communication apparatus 100 monitors a port to which an apparatus is not connected; a method in which when the packet communication apparatus 140 is connected, the packet communication apparatus 140 transmits a control packet to the packet communication apparatus 100; a method in which the manager clearly notifies the detection to the management apparatus 500, and so on.

With employment of the above-described operations, when the packet communication apparatus 140 is conducted, the filter setting operation can be automatically carried out with respect to the packet communication apparatus 140 while the manager does not perform the setting operation.

7. Role Definition by GUI

Next, description is made of a second embodiment in which the role defining process operation is carried out by GUI (Graphical User Interface). Since only a role defining process operation of the second embodiment is different from that of the first embodiment, only this different process operation is explained.

Figure 17:
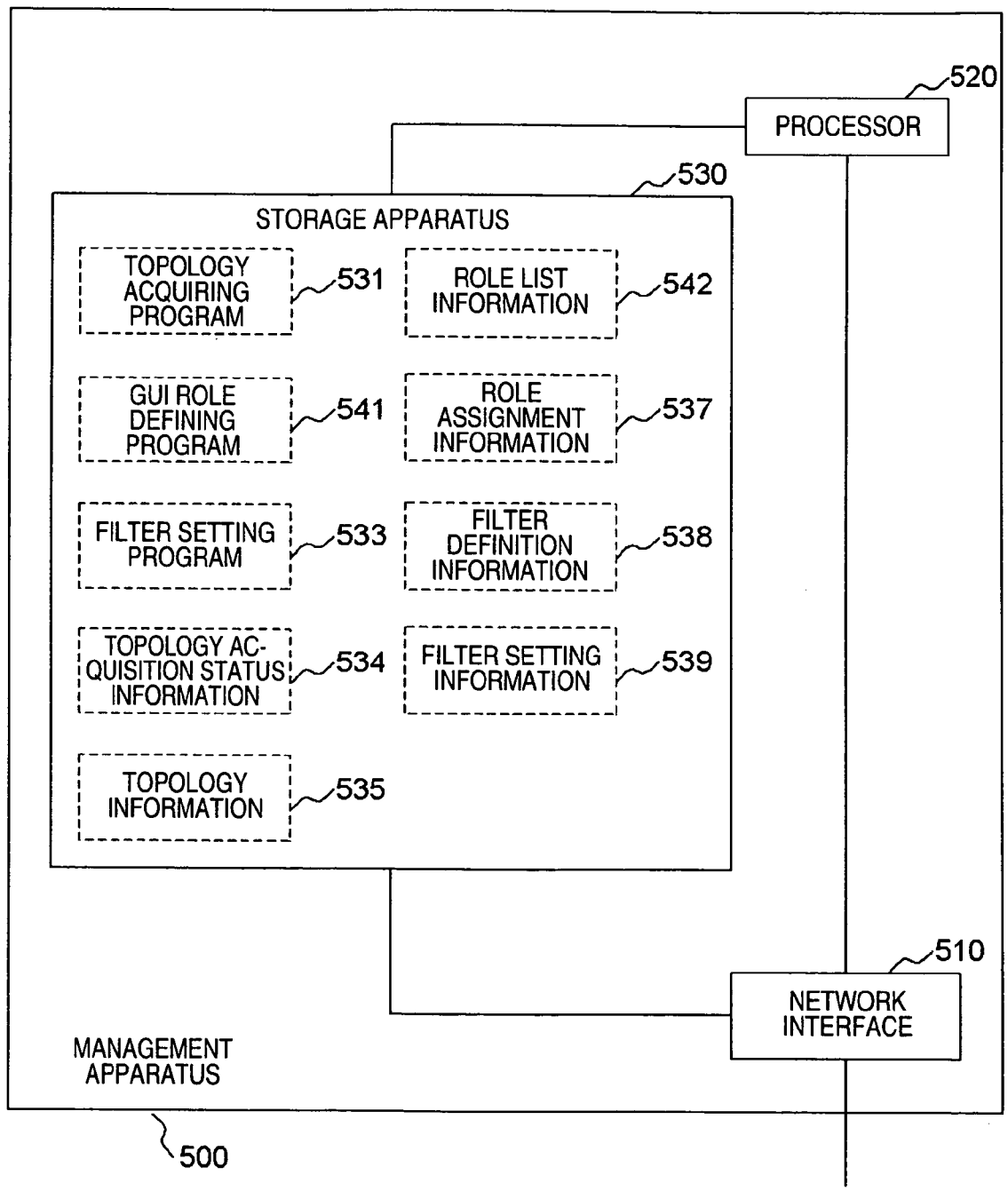
FIG. 17 is a structural diagram for showing a management apparatus 500 according to a second embodiment of the present invention.

FIG. 17 indicates a management apparatus 500 according to a second embodiment of the present invention.

The management apparatus 500 contains a network interface 510, a processor 520, and a storage apparatus 530. The storage apparatus 530 stores thereinto a topology acquiring program 531, a GUI role defining program 541, a filter setting program 533, topology acquisition status information 534, topology information 535, role list information 542, role assigning information 537, filter defining information 538, and filter setting information 539.

Figure 18:
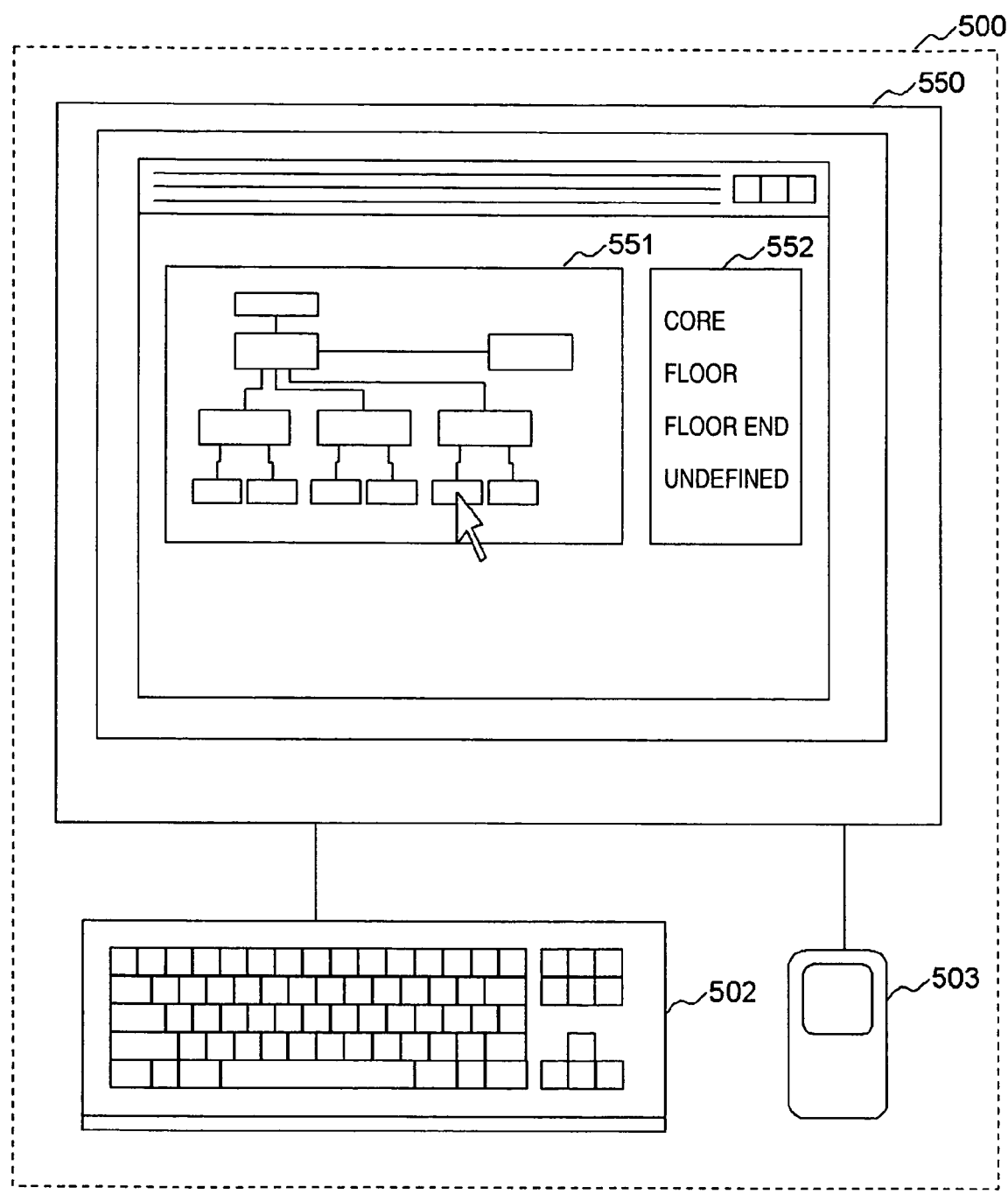
FIG. 18 is a diagram for illustratively indicating a GUI of the management apparatus 500 according to the second embodiment of the present invention.
Figure 19:
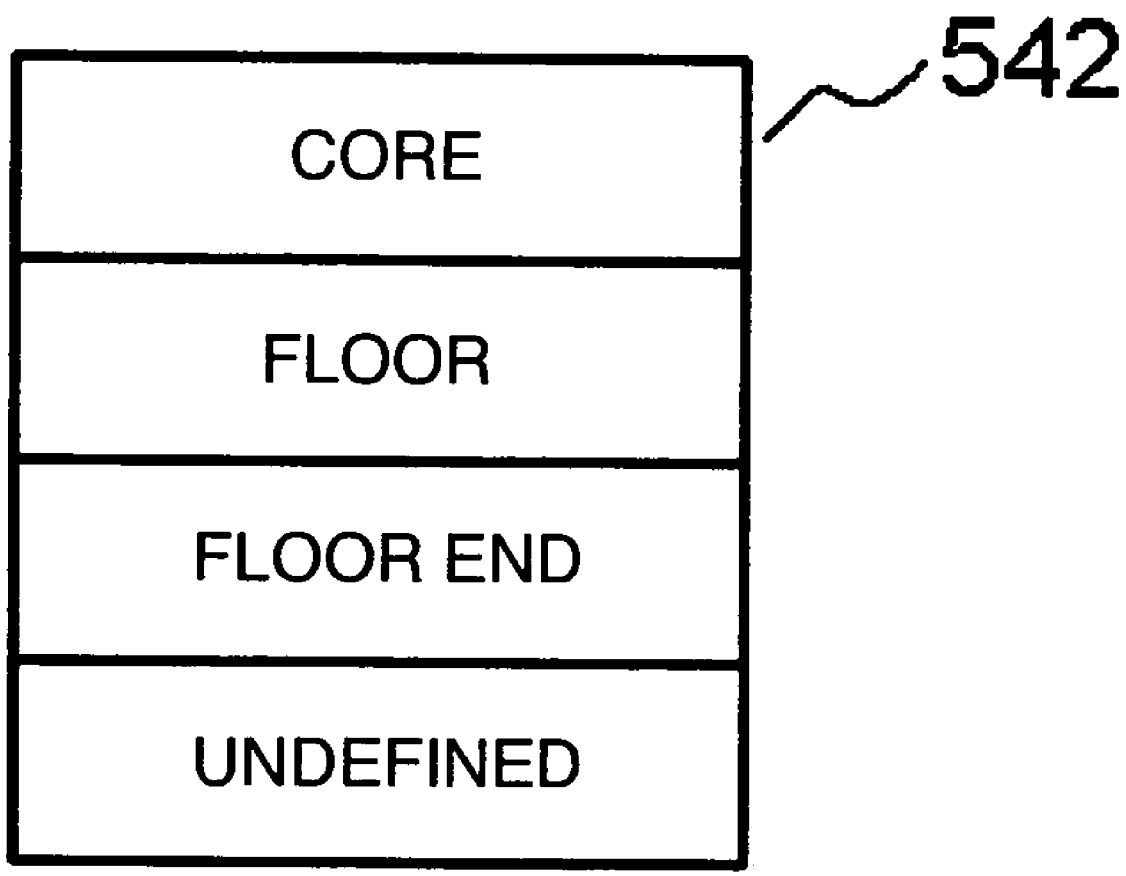
FIG. 19 is a diagram for indicating role list information 542 of the management apparatus 500 according to the second embodiment of the present invention.

With reference to FIG. 18, a role defining process operation using the GUI by the manager will now be explained. This process operation is carried out by the processor 520 of the management apparatus 500 in accordance with the GUI role defining program 541.

The control apparatus 500 is equipped with a display apparatus 550 and input apparatus 502 and 503, which are shown in FIG. 17. The display apparatus 550 contains a topology information display module 551, and a role display module 552. In the management apparatus 500, contents of both the topology information 535 and the role assigning information 537 are displayed on the topology information display module 551, and information of role list information 542 is displayed on the role display module 552. The role list information 542 corresponds to such a list that roles represented in FIG. 18 are described.

When the manager selects either a packet communication apparatus or a terminal, to which a role is set among the topology information displayed on the topology information display module 551 and designates a role from the role display module 552 by employing the input apparatus 502 and 503, the management apparatus 500 writes a content of this designation into the role assigning information 537.

When the role assigning information 537 is updated by the manager, the processor 520 starts the above-explained filter setting process operation.

In accordance with the above-explained method, the automatic setting operation of the network communication apparatus by way of the setting operation by the manager with employment of the GUI can be carried out.

8. Supplement of Role Definition by GUI

Although the GUI is employed in the above-described second embodiment, the role may be alternatively set by employing another type of user interface such as CUI (Character User Interface).

Another method may be alternatively carried out. That is, as to a packet communication apparatus and a terminal to which roles are not defined by the GUI in the second embodiment, the role may be defined by executing the role definition process operation using the role definition information 537 explained in the first embodiment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network management apparatus connected to a plurality of network communication apparatuses, including:
a network interface connectable to a network;
a storage apparatus for storing thereinto a program and data; and
a processor for executing a process operation in accordance with said program,
a module that acquires information on apparatus types and apparatus identifiers as to said plurality of network communication apparatuses and a connection relationship between the network communication apparatuses, and holds the acquired information;
a module that applies roles to said plurality of network communication apparatuses, respectively based upon the acquired information and a role assigning rule that defines correspondence between each of roles to be assigned to a present network communication apparatus and conditions for assigning which limit one of the apparatus types or the apparatus identifiers of one of the network communication apparatuses;
a module that holds an operation policy in which an operating content is described with respect to a role; and
a module that determines operating contents of the respective network communication apparatuses based upon the information pieces and the operation policies of said respective network communication apparatuses, and sets the determined operating contents to said network communication apparatuses.

2. The network management apparatus according to claim 1, wherein said module that applies roles applies a role based upon a role of a network communication apparatus located adjacent to the network communication apparatus to which the role is to be applied.

3. The network management apparatus according to claim 1, wherein said network management apparatus further comprises:
a module that outputs at least one information piece of said connection relationship, said apparatus type, and said apparatus identifier of one network communication apparatus among said network communication apparatuses which acquired the information pieces; and
a module that accepts a designation of a role which should be applied to the network communication apparatus corresponding to said outputted information piece, and
wherein said network management apparatus determines an operating content of said network communication apparatus based upon an operation policy corresponding to an designated role.

4. The network management apparatus according to claim 1, wherein the operating contents described in said operation policy correspond to packet filtering which describes a permission/non-permission of a communication between roles which are applied to the respective network communication apparatuses, and operating contents set to said respective network communication apparatuses correspond to operations of packet filtering functions of said network communication apparatuses.

5. A network system including:
a plurality of network communication apparatuses and a network management apparatus connected to said network communication apparatuses,
wherein said network management apparatus comprises:
a network interface connectable to a network;
a storage apparatus for storing thereinto a program and data,
a processor for executing a process operation in accordance with said program,
a module that acquires information on apparatus types and apparatus identifiers as to each of said plurality of network communication apparatuses and a connection relationship between the network communication apparatuses; and holds the acquired information;
a module that applies roles to said plurality of network communication apparatuses, respectively based upon the acquired information and a role assigning rule that defines correspondence between each of roles to be assigned to a present network communication apparatus and conditions for assigning which limit one of the apparatus types or the apparatus identifiers of one of the network communication apparatuses;
a module that holds operation policies in which operating contents are described with respect to said roles; and
a module that determines operating contents of the respective network communication apparatuses based upon the information pieces and operating policies of said respective network communication apparatuses, and sets the determined operating contents to said network communication apparatuses, and
wherein at least one of said network communication apparatus comprises:
a network interface connectable to said network;
a processor for processing a packet received by said network interface;
a storage apparatus for holding a route table required for said processing operation:
a module that notifies said information related to the own network communication apparatus to said network management apparatus; and
a module that operates in accordance with a setting from said network management apparatus.

6. The network system according to claim 5, wherein:
said role applying module of said network communication apparatus applies a role based upon a role of a network communication apparatus located adjacent to the network communication apparatus to which the role is to be applied.

7. The network system according to claim 5, wherein said network management apparatus further comprises:
a module that outputs at least one information piece of said connection relationship, said apparatus type, and said apparatus identifier of a network communication apparatus among said network communication apparatuses, and
a module that accepts a designation of a role which should be applied to the network communication apparatus corresponding to said outputted information piece, and
wherein said network management apparatus determines operating content of the network communication apparatus to which a role should be applied based upon a operation policy corresponding to said designated role.

8. The network system according to claim 5, wherein:
the operating contents described in said operation policy correspond to packet filtering which describes a permission/non-permission of a communication between roles which are applied to the respective network communication apparatuses; and operating contents set to said respective network communication apparatuses correspond to operations of packet filtering functions of said network communication apparatuses.

* * * * *